(12) United States Patent
Martin

(10) Patent No.: US 7,393,484 B2
(45) Date of Patent: Jul. 1, 2008

(54) FLOW GUIDE FOR UNDERWATER PELLETIZER

(75) Inventor: John W. Martin, Buchanan, VA (US)

(73) Assignee: Gala Industries, Inc., Eagle Rock, VA (US)

( * ) Notice: Subject to any disclaimer, the term of this patent is extended or adjusted under 35 U.S.C. 154(b) by 200 days.

(21) Appl. No.: 10/395,059

(22) Filed: Mar. 25, 2003

(65) Prior Publication Data

US 2003/0185923 A1    Oct. 2, 2003

Related U.S. Application Data

(62) Division of application No. 09/400,287, filed on Sep. 21, 1999, now Pat. No. 6,551,087.

(51) Int. Cl.
*B29B 9/02*      (2006.01)
*B02C 18/00*     (2006.01)

(52) U.S. Cl. .................. 264/142; 264/141; 425/313; 425/70

(58) Field of Classification Search ................ 299/81.2; 62/320, 352; 137/318, 806, 831; 37/333, 37/329; 83/402, 932, 177, 53, 745, 98, 857, 83/906; 264/142; 164/443; 425/142, 313, 425/DIG. 230, 70; 99/537; 138/97
See application file for complete search history.

(56) References Cited

U.S. PATENT DOCUMENTS

| 3,207,818 | A | | 9/1965 | Marshall ..................... 264/14 |
| 3,341,892 | A | | 9/1967 | Mayer ........................... 18/12 |
| 3,564,650 | A | | 2/1971 | Irving ......................... 18/112 |
| 3,862,285 | A | | 1/1975 | North et al. ................... 264/89 |
| 3,981,959 | A | * | 9/1976 | Cuff ............................ 264/142 |
| 4,123,207 | A | * | 10/1978 | Dudley ........................ 425/67 |
| 4,245,972 | A | | 1/1981 | Anders ........................ 425/67 |
| 4,300,877 | A | * | 11/1981 | Andersen .................... 425/67 |
| 4,321,026 | A | * | 3/1982 | Lambertus ................. 425/142 |
| 4,529,370 | A | * | 7/1985 | Holmes et al. ............. 425/142 |
| 4,621,996 | A | | 11/1986 | Hundley, III ............... 425/190 |
| 4,728,276 | A | * | 3/1988 | Pauley et al. ................. 425/67 |
| 4,846,644 | A | | 7/1989 | Lin ............................... 425/67 |
| 4,943,218 | A | | 7/1990 | Sabbioni ...................... 425/10 |
| 4,978,288 | A | | 12/1990 | Ellwood ..................... 425/311 |
| 5,017,119 | A | * | 5/1991 | Tokoi ......................... 425/142 |
| 5,059,103 | A | * | 10/1991 | Bruckmann et al. ......... 425/67 |
| 5,215,763 | A | | 6/1993 | Mattera ...................... 425/311 |
| 5,593,702 | A | * | 1/1997 | Harris et al. ................. 425/67 |
| 5,611,983 | A | * | 3/1997 | Ma et al. .................... 264/142 |

FOREIGN PATENT DOCUMENTS

| DE | 2 328 019 | 12/1974 |
| GB | 1152781 | 5/1969 |
| GB | 2 124 964 | 2/1984 |

* cited by examiner

*Primary Examiner*—Christina Johnson
*Assistant Examiner*—Matthew J. Daniels
(74) *Attorney, Agent, or Firm*—Jacobson Holman PLLC

(57) ABSTRACT

A water flow guide stationarily mounted in the water box of an underwater pelletizer to selectively direct the pressurized water flowing through the water box in order to more efficiently cool and rigidify the extruded polymer strands and enable the rotary cutter blades to more effectively shear the strands into pellets and to convey the sheared pellets away from the die face and rotary cutter blades of the pelletizer to the water box outlet. The water flow guide provides an accurately guided pressurized water flow which enables pelletization of polymers of various diameters and a wide range of specific gravity and rheological characteristics.

6 Claims, 7 Drawing Sheets

FLOW GUIDE FOR UNDERWATER PELLETIZER

This is a division of application Ser. No. 09/400,287, filed Sep. 21, 1999, now U.S. Pat. No. 6,551,087 issued Apr. 22, 2003.

BACKGROUND OF THE INVENTION

1. Field of the Invention

The present invention generally relates to improvements in underwater pelletizers and more particularly to providing a water flow guide for the water box of an underwater pelletizer to more efficiently utilize pressurized water flowing through the water box. The water flow guide of this invention produces an accurately guided pressurized water flow which improves pelletization of polymers of various diameters, especially micropellets, and polymers having a wide range of specific gravity and rheological characteristics.

2. Description of the Prior Art

Underwater pelletizers are well known and include a die plate with multiple orifices through which molten polymer strands are extruded with the orifices terminating at a die face on the die plate. A powered rotary cutter including a cutter hub mounted on a shaft with a plurality of blades supported from the cutter hub is associated with the die face for shearing the extruded polymer strands into pellets as the polymer is extruded beyond the die face. A water box encloses the die face, cutter hub and blades to form a cutting chamber through which water flows to quench and rigidify the extruded polymer strands, thus enabling the cutting blades to better shear the extruded strands into pellets. The flow of water through the cutting chamber defined by the water box also conveys a slurry of the water and sheared pellets through the outlet of the water box to a pellet dewaterer and/or a dryer. The above described underwater pelletizers are disclosed in related U.S. patents including U.S. Pat. Nos. 4,123,207, 4,251,198, 4,621, 996, 4,728,276 and 5,059,103, all owned by the assignee of this invention. Additional U.S. patents which relate to pelletizers are as follows:

| | | |
|---|---|---|
| 3,207,818 | 4,245,972 | 4,978,288 |
| 3,341,892 | 4,300,877 | 5,215,763 |
| 3,353,213 | 4,846,644 | |
| 3,862,285 | 4,943,218 | |

U.S. Pat. No. 3,341,892 illustrates cutter hub assemblies directing water flow to the cutting area of the die plate. However, the water enters through the pelletizer shaft and is routed through the cutter hub with the water serving as an aid to pelletization. The water is not pressurized in the cutting chamber and gravity is relied upon to actually get the pellets into a solid stream of water to transport the pellets to the lower portion of the cutting chamber where the pellets exit. This patent also illustrates a flute style spray nozzle assembly that introduces a spray of water directed at the cutter blades where its purpose is to assist in so-called "hot face" die plate pelletization.

U.S. Pat. No. 3,862,285 illustrates a cooling system for the production of plastic sheets incorporating a flow guide design. U.S. Pat. No. 4,245,972 illustrates the use of flow control that is actually designed to keep water away from the cut pellets until centrifugal force and gravity transport the pellets to a water ring formed within the bowl (formed at 14 and 10 in the patent).

U.S. Pat. No. 4,300,877 uses the cutter hub as an integral component of the flow control which could result in plastic contamination and cause tedious cleanup issues for operating personnel. U.S. Pat. No. 4,846,644 illustrates what is called a high speed "cooler" and is essentially a water ring pelletizer somewhat similar to the structure disclosed in U.S. Pat. No. 4,300,877 and which does not use water to encapsulate/transport the pellets as they are cut.

U.S. Pat. No. 3,207,818 illustrates a cutting process where the specific gravity of the polymer plays an important role in operation. The "chamber" has no specific water (or process medium) flow guiding devices. The flow guide of this invention operates independently of any specific gravity considerations. U.S. Pat. No. 4,978,288 illustrates a water ring pelletizer where water is again isolated from the pelletizing process until well after cutting has taken place and U.S. Pat. No. 5,215,763 also illustrates a water ring pelletizer.

While the above listed patents disclose various structures associated with underwater pelletizers, the invention disclosed in the instant application utilizes the controlled flow of water not only to assist in cutting or shearing the pellets but also to quench and isolate pellets immediately after cutting has occurred. The type of pelletization known as "hot face", as shown in U.S. Pat. No. 3,341,892, uses an assist spray and is not underwater pelletization as utilized in the present invention. Underwater pelletization as in the present invention utilizes the pressurized water to encapsulate and isolate the pellets and also uses the pressurized water to transport the pellets away from the cutter hub.

The water flow guide of the present invention produces a pressurized water flow, accurately guided, to allow the underwater pelletization of polymers of nearly any diameter, even micropellets, i.e. pellets formed from polymer strands extruded through orifices having a diameter less than or equal to 0.050 inches, as well as polymers of a wide range of specific gravity/rheological characteristics. The flow guide within the underwater pelletizer relies on the water pressure/flow as opposed to gravity, such as is used in water ring pelletizers, and the pressurized water actually transports the pellets from the moment they are cut until they are introduced into a drying structure.

SUMMARY OF THE INVENTION

The water flow guide of the present invention is positioned within the cutting chamber defined by the water box of an underwater pelletizer in order to selectively guide the pressurized water passing through the water box. By selectively guiding the pressurized water in the cutting chamber, it has been found that the water can more efficiently quench the extruded polymer strands to cool and rigidify the strands, thus enabling the cutter blades to more effectively and cleanly cut or shear the extruded strands into pellets. Also by selectively guiding the pressurized water with the water flow guide of this invention it is possible to increase the efficiency of the pressurized water flowing through the water box to convey the sheared pellets away from the cutting chamber to the water box outlet and then to a pellet dewaterer and/or a pellet dryer.

In addition, the flow guide of this invention permits flow management of the pressurized water flow into and around the cutter within the cutting chamber. This leads to a reduction or even elimination, of cavitation which occurs when water cannot get into the central area of the cutter hub and die plate, thus reducing or eliminating pellet clusters or agglomerates forming in the cutting chamber, especially when producing micropellets. By reducing or eliminating pellet clusters or agglomerates, expensive shutdowns of the equipment and operator requirements and time to clean up and restart are significantly reduced. In addition, the wasting of polymer materials is reduced, all increasing productivity of the pelletizer. Moreover, if agglomerations and cutting chamber clog ups occur, the agglomerate or clog within the cutting chamber is easier to clean off and remove by the operator because there is no longer a large open cutting chamber to fill up with molten, but solidifying polymer. Furthermore, the reduction of cavitation allows the pelletizer to produce good quality, well sheared pellets at higher speeds and/or with more cutter blades, thus making it possible to yield higher rates of production, in pounds/hour or kilograms/hour, which results in a higher capacity for the same size pelletizer.

Furthermore, it is believed that the flow guide of the present invention allows the pelletizer to operate with less load, and thus pulls less amperes by the motor which, in turn, allows the pelletizer to operate more efficiently with less power requirements. Also, in utilizing the water more efficiently with the flow guide of the present invention, less water flow is required for the pelletizer. Less water flow translates into smaller pumps and/or less pump energy consumption.

The water flow guide of this invention is oriented in the cutting chamber between the water inlet and the water and pellet slurry outlet of the water box which are typically disposed in diametrically opposed relation, such as a water inlet at the bottom of the cutting chamber and the water and pellet slurry outlet at the top. The water flow guide effectively directs the pressurized cooling water toward the die face and the polymer strands being extruded from the die face. By directing the water flow to the die face, it has been found that the water more efficiently cools and rigidify the polymer strands in order that the rotating cutting blades can shear the extruded polymer strands with a straight diametric cut. Also, effective direction of the pressurized water flow in association with the die face will more effectively entrain the sheared pellets in the water flow thereby more efficiently conveying the slurry of water and pellets to the outlet in the water box which enables the slurry to be introduced into a pellet dewaterer or pellet dryer.

The water flow guide is stationarily mounted within the cutting chamber, preferably on the front of the pelletizer. The flow guide is in the form of a cylindrical tubular member affixed to the pelletizer in generally concentric relation to the rotating shaft of the pelletizer, preferably with the body of the guide filling out the majority of the cutting chamber volume. The free end of the guide tubular member preferably terminates adjacent to the rotating cutter hub and cutting blades mounted thereon.

In a first embodiment of the invention, the water flow guide is a generally cylindrical tubular member with the external surface thereof being disposed adjacent to the generally cylindrical inner surface of the water box, preferably with a very small clearance therebetween. The tubular member includes a generally cylindrical axial bore which is positioned over and surrounds the rotating cutting hub shaft forming an annular space therebetween. The cylindrical outer surface of the water flow guide includes diametrically opposed axially extending recesses with one recess in alignment with the water inlet and the other recess in alignment with the slurry outlet of the water box. One end of each of the axial recesses is spaced from the ends of the cylindrical surface and in registry with the water inlet and slurry outlet, respectively. The other end of each of the axial recesses opens to a free end of the water flow guide which terminates adjacent the cutter hub and cutter blades.

As such, the flow of water is directed axially from the water inlet toward the die face and the flow of water and pellets is directed axially away from the die face and cutter hub toward the slurry outlet. Water flows from the axial recess in registry with the water inlet across the die face for more effective heat exchange engagement with the polymer strands being extruded from the die face to more efficiently cool and rigidify the extruded polymer strands which enables the extruded strands to be more effectively sheared into pellets by the cutter blades. The water and sheared pellets then are discharged along the axial recess in registry with the outlet in the water box as a slurry of pellets and water. The slurry enters the open end of the axial recess in registry with the outlet and moves axially in the recess in the outer surface of the water flow guide and then out through the outlet in the water box.

In a second embodiment of the invention, the water flow guide also comprises a generally cylindrical tubular member with an outer wall, again preferably, sized to be only slightly smaller than the inner wall of the water box to provide a very small clearance between the adjacent surfaces. However, the tubular member in this embodiment has a radial opening forming a tubular radial extension of the pressurized water inlet which terminates in the internal annular space defined by the cylindrical axial bore spaced concentrically from the cutter shaft of the pelletizer. An open end of the cylindrical axial bore terminates in spaced but adjacent relationship to the cutter hub and cutter blades to enable incoming pressurized water to be discharged from the open end of the cylindrical bore toward the cutter hub, cutter blades and die face. The pressurized water flow in the annular space between the shaft and the cylindrical inner wall of the axial bore flushes pellets from this area to keep it clear of pellets and can serve to prolong the life expectancy of the pelletizer shaft seals. This embodiment of the water flow guide also includes an external cylindrical surface having an axial recess in alignment with the outlet of the water box similar to the corresponding recess in the first embodiment. One end of the axial recess is in registry with the outlet. The axially extending recess includes an open end terminating adjacent the cutter hub to provide a flow passage for the slurry of water and pellets being discharged from the pelletizer.

In a third embodiment of the invention, the water flow guide again includes the generally tubular cylindrical member as described in the first and second embodiments. The cylindrical member also has a pair of diametrically opposed recesses aligned with and in registry with the pressurized water inlet and outlet in the water box in a manner similar to the recesses as described in the first embodiment. However, in this embodiment, the free end of the water flow guide is sloped or beveled so that the bottom portion of the right side of the free end of the water flow guide is spaced from the die face a distance less than the upper portion of the right side. The left side of the free end is oppositely sloped. Therefore, water entering the water box and passing through the axial recess toward the die face encounters less resistance to flow as it enters a larger volumetric area between the bottom portion of the free end of the water flow guide and the die face. The slope or bevel and the counterclockwise rotation of the cutter hub and cutters at relatively high rotational speed provides less resistance to water flow to the left side of the water flow guide before getting to the area in which the cutter hub and cutter blades are rotating thereby avoiding the tendency of the majority of water flow occurring across one-half of the water flow guide and cutter hub and cutter blades. The right side of the water flow guide is more restrictive to water flow immediately as it travels across the water inlet area. As the rotating cutter hub and cutter blades are rotating and cutting plastic pellets, the total flowing mass consisting of water and pellets is increasing. The additional free flow area in the water flow guide accommodates the pellets being added to the water flow stream as they are being sheared from the polymer strands at the die face.

In a fourth embodiment of the invention, the water flow guide includes a tubular cylindrical member constructed in accordance with the third embodiment with the addition of a radially extending hole extending straight inwardly from the inner surface of the axial recess in registry with the pressurized water inlet. The inner end of the radial hole terminates at the surface of the axial bore of the tubular member which is spaced concentrically around the cutter shaft. This enables a portion of the pressurized water to flow around the cutter shaft in order to flush the area around the cutter shaft. This circular flow around the cutter shaft removes any cut pellets that may have a tendency to pack into this area. Maintaining the area around the cutter shaft free of pellets can prolong the life of cutter shaft seals.

In each embodiment of the invention, pressurized water inflow is directed axially toward the die face, the cutter hub and cutter blades for more effective heat exchange contact between the cooling water and strands of polymer extruded from the die face to cool and rigidify the strands of polymer for more efficient shearing of the polymer strands by the cutting blades. Also, the slurry of water and polymer plastics are more effectively moved away from the rotating cutter hub and cutter blades and discharged axially toward the outlet of the water box.

Accordingly, it is an object of the present invention to provide a water flow guide positioned in the cutting chamber of an underwater pelletizer to guide pressurized water flow from a water inlet, axially toward the die face for more effective heat exchange contact with the polymer strands being extruded through the die plate in order for the rotating cutter blades to more effectively shear the polymer strands into pellets. The pressurized slurry of pellets and water flow is then directed away from the die face radially and axially to a water and pellet slurry outlet for subsequent separation of pellets and water and drying of pellets. The selectively guided pressurized water flow assists in quenching the polymer strands, shearing the strands into pellets and transporting the pellets after shearing.

Another object of the present invention is to provide a water flow guide associated with the interior of a cutting chamber of an underwater pelletizer for establishing an axial flow path for incoming water from a lateral or radial inflow to direct water toward the cutter hub, cutter blades and die face to more efficiently cause heat exchange contact with the extruded polymer for cooling and rigidifying polymer strands extruded from the die face for more effective shearing of the strands into pellets with the flow guide also establishing an axial flow path for discharge of a slurry of pressurized water and pellets to a radial or lateral discharge outlet in a water box of an underwater pelletizer.

A further object of the present invention is to provide a water flow guide stationarily positioned in the cutting chamber of an underwater pelletizer in which the flow guide with the tubular member defines passages for circulation of incoming pressurized water toward and around the die face, cutter hub and cutter blades for efficient heat exchange contact with the polymer strands as they are extruded and sheared at the die face and then axially away from the die face to a discharge for more efficiently discharging the slurry of water and sheared pellets.

Another object of the present invention is to provide a water flow guide in accordance with preceding objects in which the water flow guide comprises a generally tubular member which includes diametrically opposed axial recesses in the external surface thereof extending from an end of the tubular member adjacent the cutter hub and cutter blades axially to a point in alignment with the water inlet and slurry outlet of the cutting chamber.

A still further object of the present invention is to provide a water flow guide in which the tubular member includes an axial bore having an internal surface spaced from the shaft drivingly supporting the cutter hub and cutter blades with the tubular member including an inlet extension communicating the pressurized water inlet of the cutting chamber with the internal surface of the tubular member so that inlet water can flow axially around the drive shaft toward the cutter hub and die face to maintain the space between the internal surface of the guide and shaft free of pellets.

Still another object of the present invention is to provide a water flow guide associated with the water box, cutting chamber, cutting hub and cutting blades to define a water flow path oriented across the die face for more efficient use of the water in cooling and rigidifying polymer strands extruded from the die face and more efficient use of the water in entraining and conveying pellets sheared from the strands to the outlet of the cutting chamber.

Yet another object of this invention to be specifically enumerated herein is to provide a water flow guide in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Although four preferred embodiments of the invention are explained in detail, it is to be understood that the invention is not limited in its scope to the details of construction and arrangement of components of these specific embodiments. The invention is capable of other embodiments and of being practiced or carried out in various ways. Also, in describing the preferred embodiments, specific terminology will be resorted to for the sake of clarity. It is to be understood that each specific term includes all technical equivalents which operate in a similar manner to accomplish a similar purpose.

Figure 1:
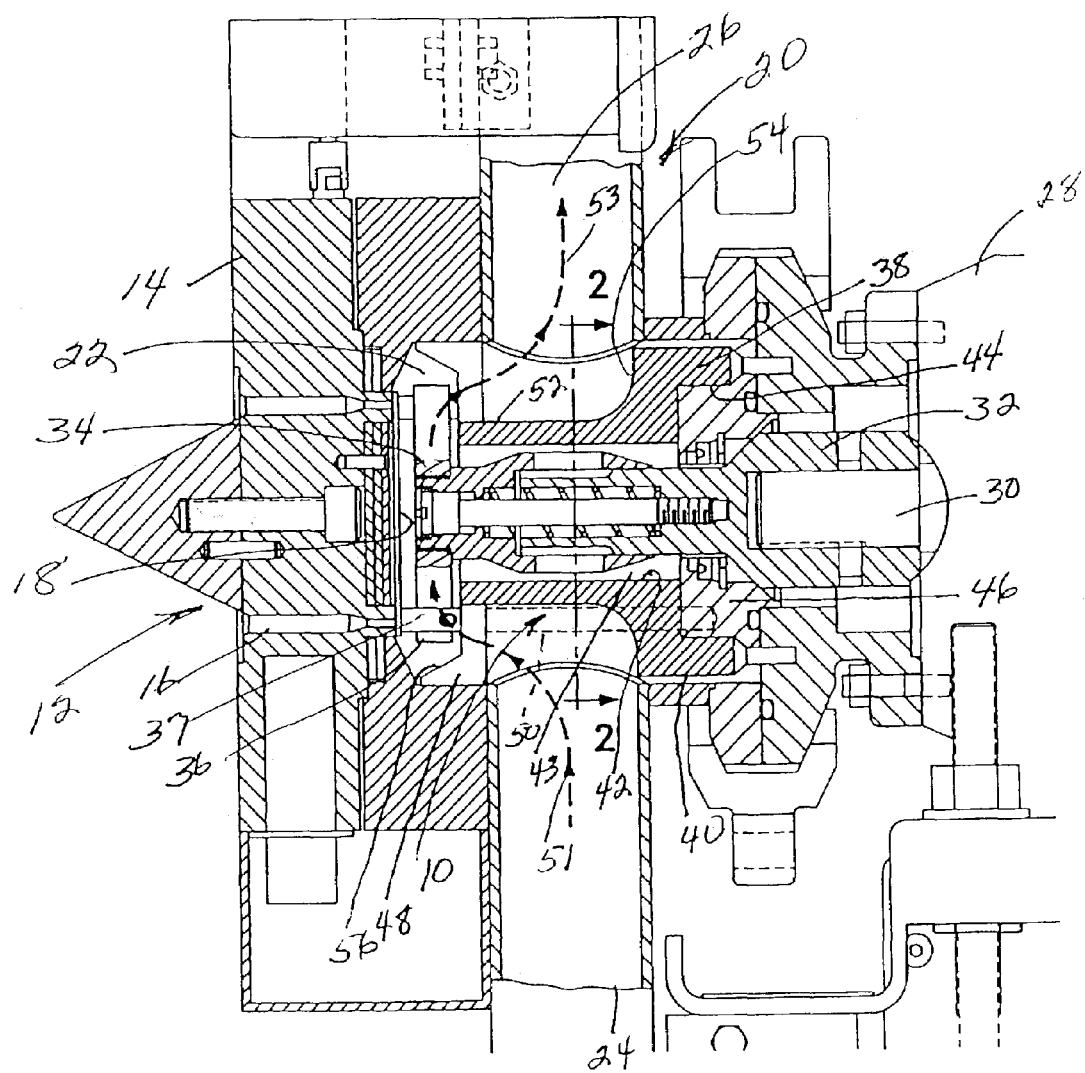
FIG. 1 is a vertical, longitudinal sectional view of an underwater pelletizer having one embodiment of a water flow guide in accordance with the present invention positioned therein and illustrating the water flow path through the cutting chamber.
Figure 2:
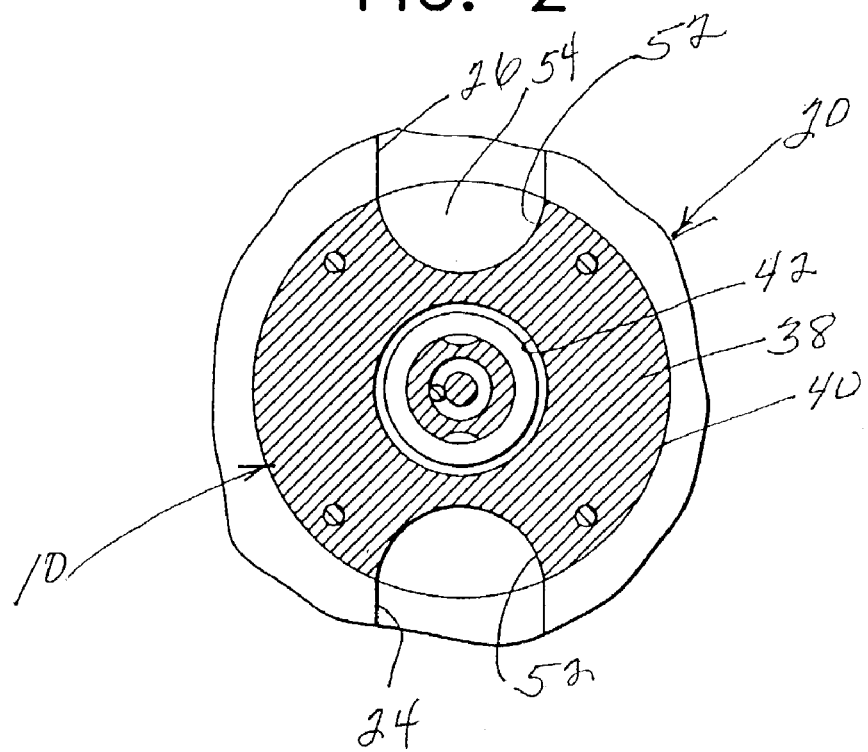
FIG. 2 is a transverse, vertical sectional view along section line 2-2 in FIG. 1 illustrating the association of the water flow guide to the water box, pelletizer drive shaft, cutter hub, water inlet and water and slurry outlet.
Figure 3:
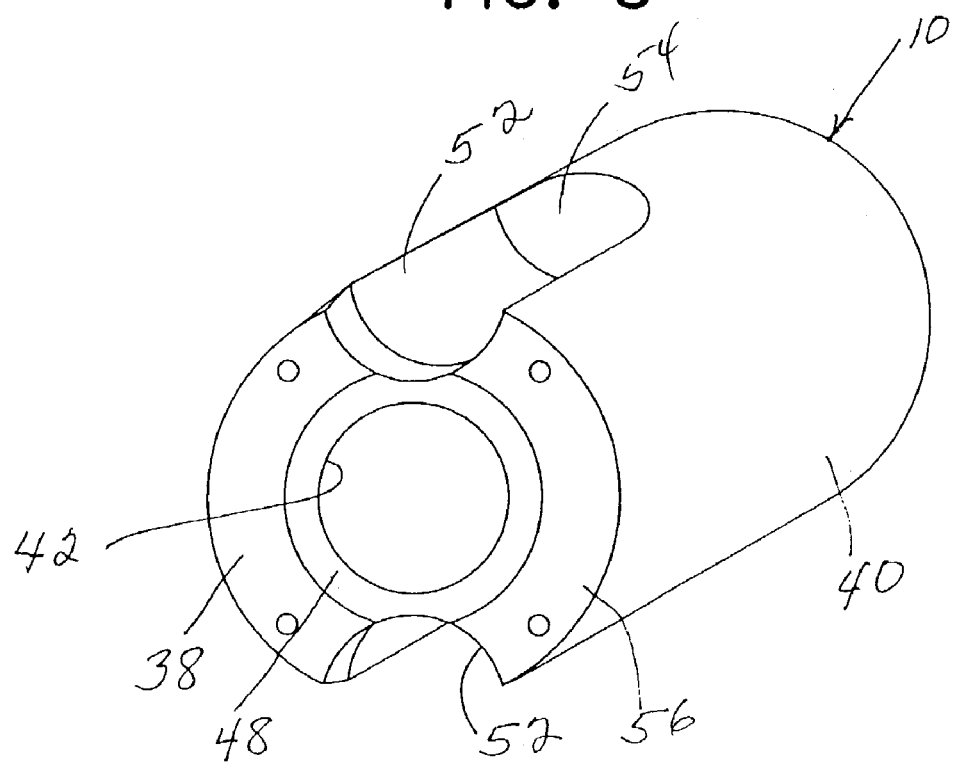
FIG. 3 is a perspective view of the water flow guide shown in FIGS. 1 and 2 looking at the end adjacent the die plate, cutter hub and cutter blades.

FIGS. 1-3 illustrate a water flow guide generally designated by reference numeral 10 associated with an underwater pelletizer generally designated by reference numeral 12 such as that disclosed in U.S. Pat. No. 5,059,103. The underwater pelletizer 12 is schematically illustrated and includes a die plate 14 having a plurality of die orifices 16 therein through which molten polymer is extruded into strands which pass through a die face 18 on the inner surface of the die plate 14. The die plate 14 is connected to a pelletizer water box generally designated by reference numeral 20 which includes a cutting chamber 22 and also includes a pressurized water inlet 24 and a diametrically opposed outlet 26 for discharge of a pressurized slurry of water and pellets from the cutting chamber 22 for conveyance out of the water box 20 to a pellet dewaterer and/or a pellet dryer (not shown). The pelletizer 12 includes a motor 28 with an output shaft 30 drivingly connected to a cutter hub shaft 32 having a cutter hub 34 mounted thereon. The cutter hub 34 includes a plurality of radially extending support arms 36 which support replaceable cutter blades 37 which coact with the die face 18 to shear the extruded strands of polymer into pellets. Except for the water flow guide 10 of the present invention, the structure of the underwater pelletizer may correspond generally with that disclosed in U.S. Pat. No. 5,059,103 or any other known configuration and design.

An underwater pelletizer, such as illustrated in U.S. Pat. No. 5,059,103, utilizes water to cool and rigidify the strands of polymer as they are discharged from the die face with the spacing of the cutter blades and the rotational speed of the cutter hub determining the size of pellets sheared from the extruded polymer strands. Water flowing in through the water inlet not only cools and rigidifies the polymer strands but also conveys the sheared pellets as a slurry from the cutting chamber into the outlet.

As shown by the arrows 51 and 53 in FIG. 1, the water flow guide 10 of the present invention guides the inlet water from inlet 24 toward the die plate 14 so that it moves along the surface of the die face 18 and over and around the rotating cutter hub 34 and cutter blades 37 by selectively directing this water flow the extruded strands of polymer may be more efficiently quenched thereby more effectively cooling and rigidifying the polymer strands. The better cooling and rigidification allows the rotating cutter blades 37 to more effectively shear the extruded strands to form pellets by making a substantially straight diametric cut through the polymer strands. Also, the water flow guide 10 provides more effective entrainment of the pellets in the water and more effective conveyance of the water and pellet slurry through the flow path for discharge through outlet 26 from the water box 20 for subsequent dewatering and drying.

The water flow guide illustrated in FIGS. 1-3 of this invention includes a generally cylindrical tubular member 38 having an outer surface 40 and a cylindrical axial bore or chamber 42 which is substantially concentric with and closely surrounds the drive shaft 32 as illustrated in FIG. 1, thus forming an annular space 43. The cylindrical tubular member 38 includes a peripheral recess 44 in one end thereof which conforms with and fits over a cylindrical projection 46 forming part of the pelletizer. The opposite end 48 or free end of the cylindrical member 38 is flat with a tapered or beveled edge 56 around its periphery. The free end 48 terminates adjacent the cutter blades 37 on the cutter hub 34. A plurality of longitudinally extending through bolts 50 are countersunk into the flat surface 48 of the tubular member 38 and extend therethrough and screw thread into the projection 46 of the pelletizer structure. Thus, the tubular cylindrical member 38 is rigidly affixed to the pelletizer and is oriented in concentric relation to the cutter hub shaft 32 with the external surface 40 adjacent the interior surface of the cutting chamber 22.

The external surface 40 of the cylindrical member 38 includes diametrically opposed longitudinally extending grooves or recesses 52 which are arcuate in transverse configuration. The grooves or recesses 52 are in alignment with the diametrically opposed water inlet 24 and slurry outlet 26, respectively. The inner end of each recess 52 is preferably arcuately curved at 54 so that the outer edge of the upwardly curved inner end coincides with the interior surface of the aligned edge of each the water inlet 24 and the slurry outlet 26, respectively. The outer end of each recess terminates at the free outer end 48 and beveled edge surface 56 which faces the rotational path of the cutter blades 37 as illustrated in FIGS. 1 and 3.

Preferably, the external surface 40 of the guide is closely adjacent or engaging the internal surface of the cutting chamber 22 and the flat surface 48 is closely adjacent the cutter hub 34 and cutter blades 37 with sufficient clearance not to interfere with their rotation. Thus, except for the selectively designated water flow paths defined by recesses 52, and the space around the die plate 18, cutter hub 34 and cutter blades 37, the guide 10 preferably fills the whole cutting chamber 22. As illustrated in FIG. 2, the close fitting relationship of the water flow guide 10 in relation to the water box 20 and cutting chamber 22 assures that incoming pressurized water will engage the axial recess 52 in alignment with the water inlet 24 causing the water to move axially toward the die face 18, the cutter hub 34, cutter hub arms 36 and cutter blades 37 and then transversely across the die face 18 and around the cutter hub assembly. This selective direction of the water thus results in more effective heat exchange contact with polymer strands extruded through the die face 18 as illustrated by the arrows 51 and 53 in FIG. 1. Water passing over the die face 18 and over the cutter hub 34 not only will more effectively cool and rigidify the polymer strands for more effective and efficient shearing of the strands into pellets but also will more efficiently entrain the pellets in the water flow for more effective conveyance of the pellets in the water slurry for discharge through the axial recess 52 in alignment with the outlet 26.

As discussed above, use of the water flow guide 10 of the present invention substantially reduces cavitation of water in the cutting chamber 22 which occurs in underwater pelletizers due to the rotational movement of the cutter hub, arms and cutter blades which tend to create a vacuum at the center of rotation. This center vacuum may be considered a vacuum bubble and the size of the vacuum bubble will vary depending upon the cutter hub speed, number of blades and the size of the blades and the water pressure within the water box. Cavitation or a vacuum bubble can contribute to significant cutting problems especially when shearing polymer products that are difficult to shear or those considered as sticky or of a very low viscosity. Thus, the reduction of cavitation provides good quality, well sheared pellets at higher speeds with more cutting blades thereby increasing yield rates of production and provides the capability to produce smaller size pellets.

In addition, use of the water flow guide 10 reduces or eliminates clusters and agglomerates which tend to build up in the cutting chamber, especially when producing micropellets, i.e. less than or equal to 0.050 inches. When clustering or agglomerates occur, the pelletizer must be shut down for clean up and then restarted which results in substantial down time of the equipment, wasted operator time and waste of polymer materials as well as reduced productivity. Even if agglomeration, or cutting chamber clog up, occurs the guide 10 enables the agglomerate or clogging material to be more easily cleaned off or removed from the cutting chamber by the operator because there is no longer a large open cutting chamber that fills up with molten but solidifying polymer.

Use of the water flow guide 10 also allows the underwater pelletizer to operate with less motor load requiring the use of less energy. Also, by increasing the efficiency of the pressurized water flow, the water flow guide allows less water flow for the pelletizer which enables smaller pumps and less pump energy consumption.

Figure 4:
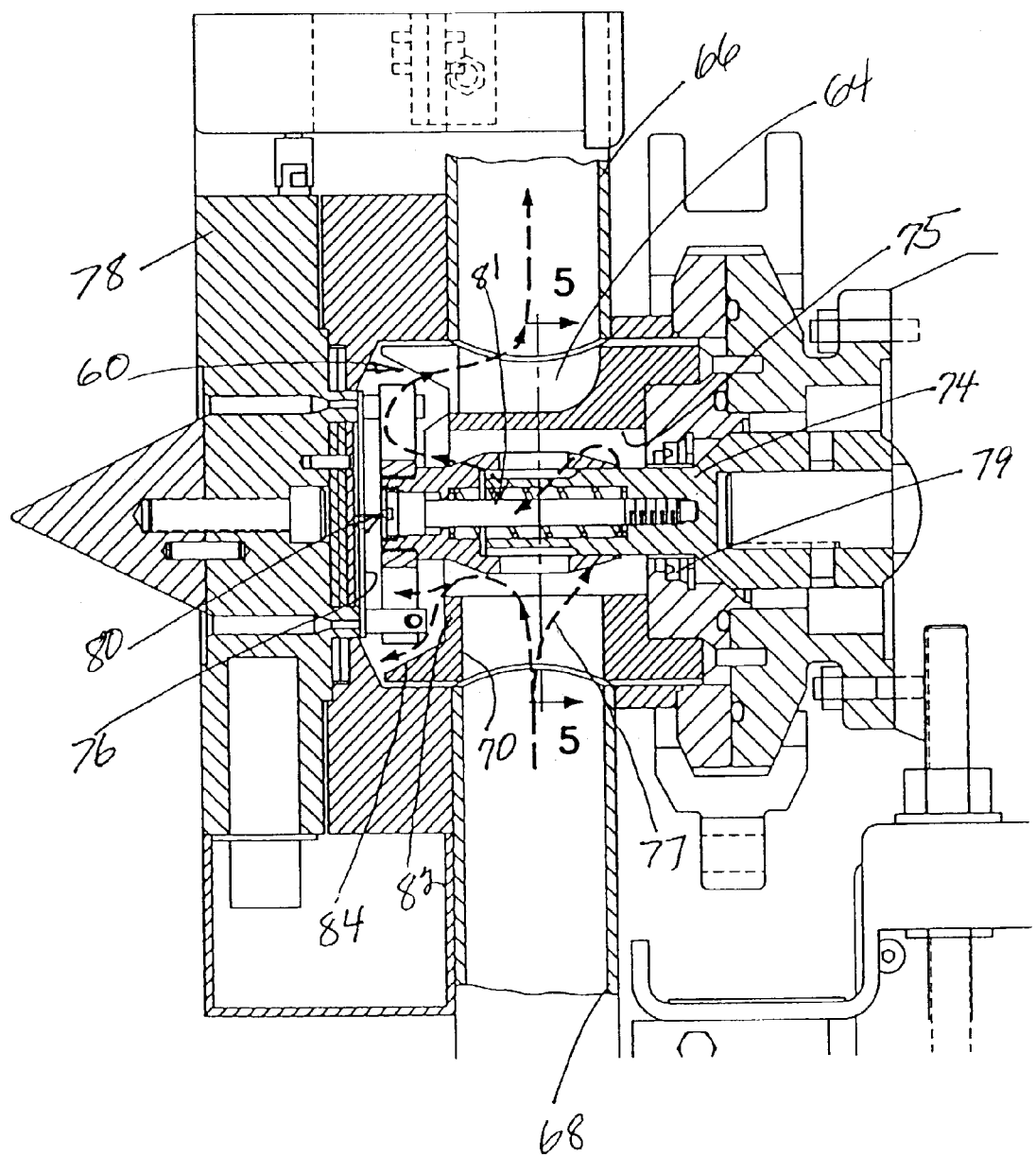
FIG. 4 is a vertical longitudinal, sectional view of an underwater pelletizer having a second embodiment of a water flow guide in accordance with the present invention positioned therein and illustrating the flow path of water through the cutting chamber.
Figure 5:
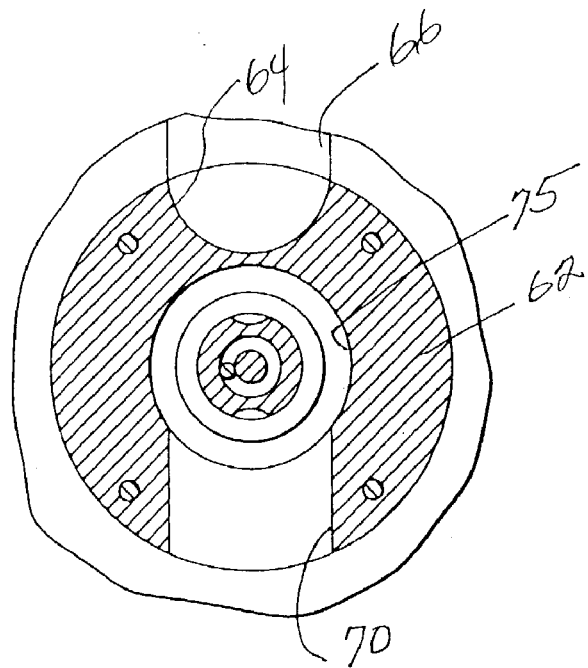
FIG. 5 is a transverse, vertical sectional view along section line 5-5 in FIG. 4 of the water flow guide illustrating its association with the water box, pelletizer drive shaft, cutter hub, water inlet and water and slurry outlet.
Figure 6:
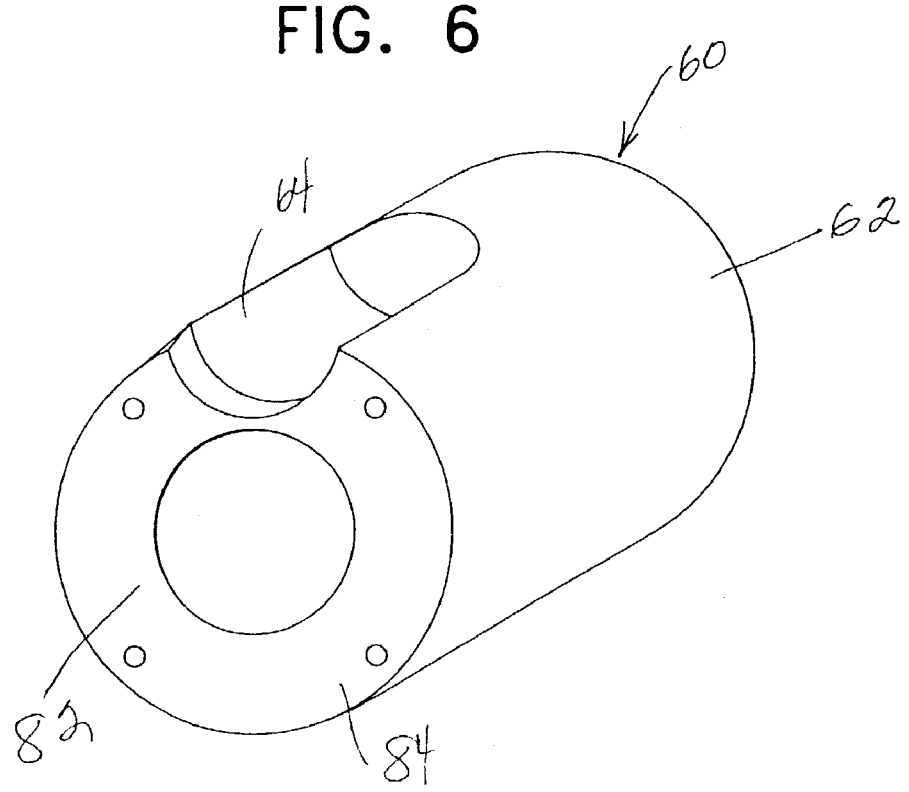
FIG. 6 is a perspective view of the water flow guide shown in FIGS. 4 and 5 looking at the end adjacent the die plate, cutter hub and cutter blades.
Figure 7:
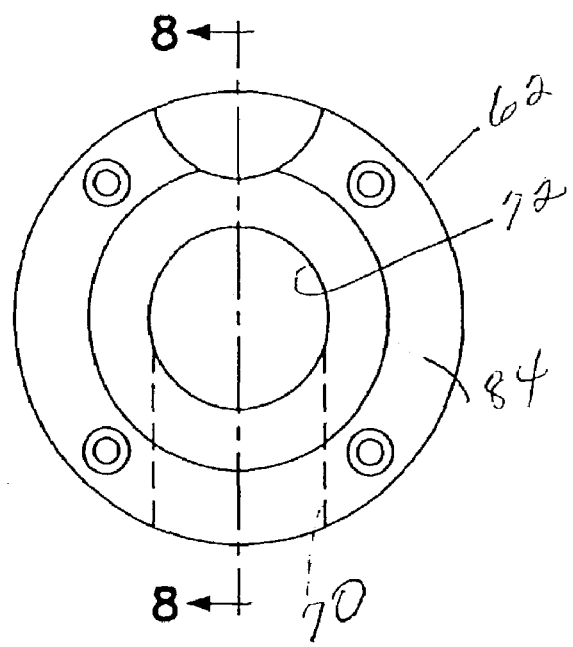
FIG. 7 is an end elevational view of the water flow guide illustrated in FIGS. 4-6 looking at the end adjacent the die plate, cutter hub and cutter blades.
Figure 8:
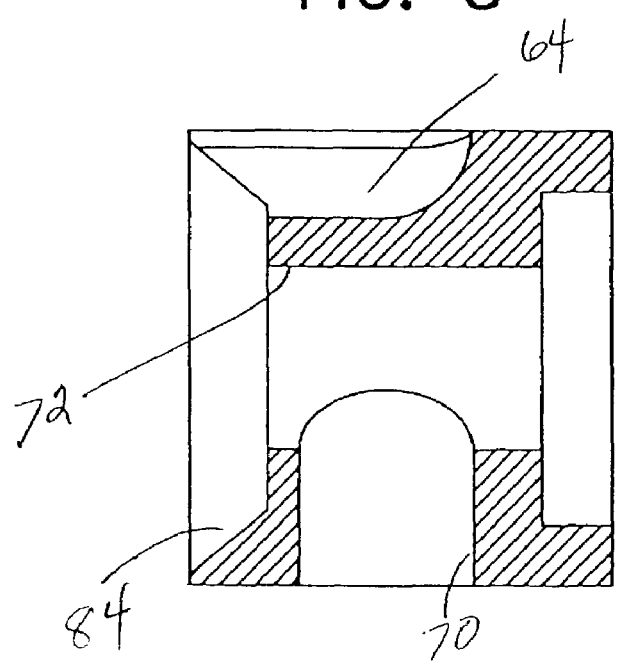
FIG. 8 is a vertical sectional view of the water flow guide illustrated in FIG. 7 taken along section line 8-8 on FIG. 7.

FIGS. 4-8 illustrate a second embodiment of the water flow guide of the present invention associated with an underwater pelletizer in a manner similar to that illustrated in FIGS. 1-3. In this embodiment, the flow guide generally designated by the reference numeral 60 comprises a cylindrical tubular member 62 having an axial external recess 64 which is the same as and operates in the same manner as the recess 52 in FIGS. 1-3 and is in alignment with the outlet 66 for discharge of the water and pellet slurry. However, in this embodiment of the invention, the outer surface of the cylindrical member 62 in alignment with the water inlet 68 includes a radial passageway 70 which generally forms a continuation or extension of the water inlet 68 and which communicates with a cylindrical interior surface 72 in the tubular cylindrical member 62. The interior surface 72 is generally concentric with and surrounds the pelletizer shaft 74. The cylindrical interior surface 72 is preferably spaced a greater distance from the exterior surface of the drive shaft 74 than in the first embodiment, as illustrated in FIG. 4, thus forming an annular space 75 defining a generally annular water flow path between the interior surface 72 and the shaft 74. This annular space and flow path enables incoming pressurized water to move in a circular or spiral path, indicated by the reference numeral 77, around the drive shaft 74 and axially of the drive shaft for discharge through the open end of the tubular cylindrical member 62 toward the die face 76 on the die plate 78 and toward, over and around the cutter hub and blade assembly generally designated by reference numeral 80.

The free end edge of the cylindrical member 62 adjacent the cutter hub and blade assembly 80 and peripherally of the interior surface 72 is flat with a tapered or beveled surface 84 similar in configuration to the end edge of the first embodiment illustrated in FIGS. 1-3 and guide flow path 75 outwardly of the tubular member 62 and downwardly along the surfaces 82 and 84 for more effective contact with the entire surface area of the die face 76. The flow path of the water in this embodiment of the invention is also illustrated by the arrows in FIG. 4 with the water moving in a circular path and in an axial path toward the die face 76 for more effective heat exchange contact with the polymer strands being extruded from the die face 76 to cool and rigidify the polymer strands for more effective shearing into pellets and more effective entrainment of the pellets with the water to enable discharge of a water and plastic pellet slurry away from the cutter hub and blade assembly 80 to the outlet 66 and then to a dewaterer and/or pellet dryer.

This embodiment of the water flow guide keeps the shaft area flushed which can protect the shaft and reduce or eliminate pellet or fines buildup around the shaft 74 thereby reducing seal failures (seals generally designated by reference numeral 79). The flushing of the annular space 75 also prevents buildup of pellets or fines in those components of the spring bias structure, generally designated by reference numeral 81, incorporated into the cutter hub drive shaft which can reduce spring design effectiveness and require frequent maintenance and cleaning.

Figure 9:
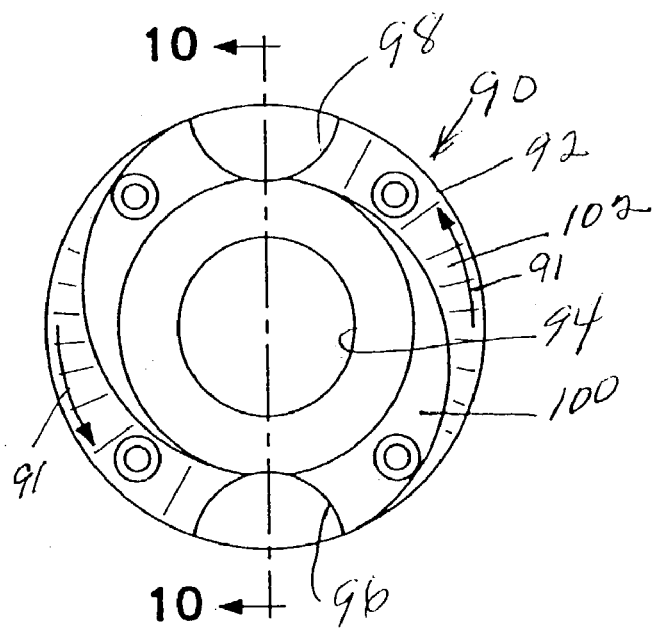
FIG. 9 is an end elevational view of a third embodiment of a water flow guide in accordance with the present invention looking at the end adjacent the die plate, cutter hub and cutter blades.
Figure 10:
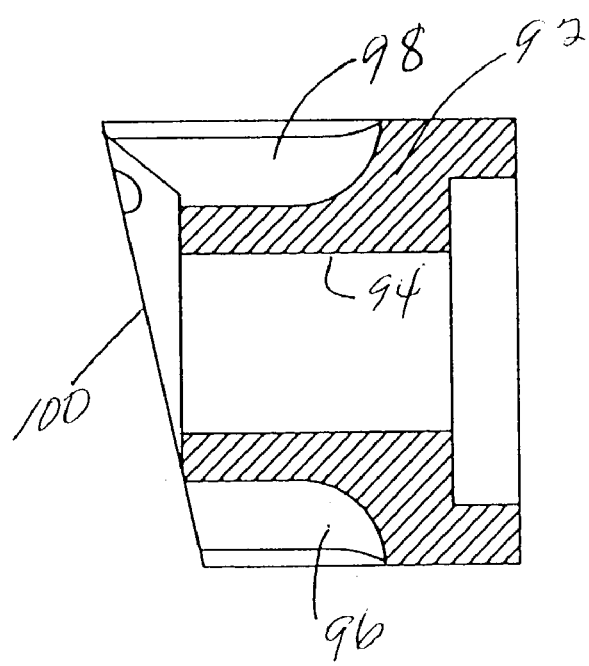
FIG. 10 is a vertical sectional view of the embodiment of the invention illustrated in FIG. 9 taken along section line 10-10 on FIG. 9.

FIGS. 9 and 10 illustrate a third embodiment of the water flow guide of the present invention generally designated by reference numeral 90. Flow guide 90 comprises tubular member 92 having an internal axial bore 94, an external axial recess 96 for alignment with a pressurized water inlet and a diametrically opposed axial recess 98 for alignment with a water and pellet slurry outlet. This embodiment of the invention is oriented in the same position in the water box are the first and second embodiments as illustrated in FIGS. 1 and 4.

The free end of the water flow guide 90 is beveled or sloped at 100 so that the distance between the lower portion of the water flow guide 90 and the die face is greater than the distance between the upper portion of the free end 100 of the flow guide 90 from the die face. Thus, water entering the water box and passing through the axial recess 96 toward a die face encounters less resistance to flow as it enters a larger volumetric area between the bottom portion of the free end of the water flow guide 90 and the die face. As illustrated in FIG. 9, the arrows 91 on flow guide 90 indicate the counterclockwise direction of rotation of the cutter hub and cutter blades at a relatively high rotational speed. The sloped end 100 provides less resistance to water flow to the left side of the water flow guide before getting to the area in which the cutter hub and cutter blades are rotating thereby avoiding the tendency of the majority of water flow occurring across one-half of the water flow guide and cutter hub and cutter blades. The right side of the water flow guide is more restrictive to water flow as it travels across the water inlet area. In addition, a tapering sloped relief 102 is provided in the sloped end 100 of the water flow guide in opposing angular directions on the free end of the water flow guide. As the rotating cutter hub and cutter blades are rotating and cutting plastic pellets, the total flowing mass consisting of the water and pellets is increasing. The additional free flow area in the right side of the water flow guide accommodates the pellets being added to the water flow stream as they are being sheared from the polymer strands at the die face.

Figure 11:
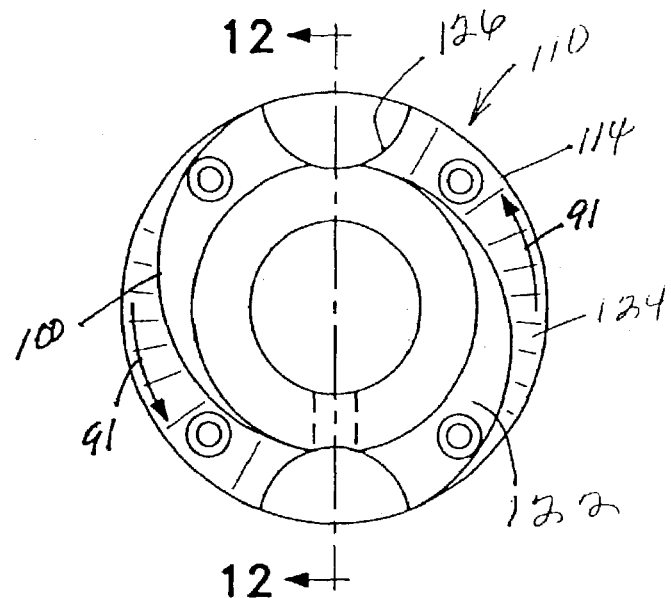
FIG. 11 is an end elevational view of a fourth embodiment of a water flow guide in accordance with the present invention looking at the end adjacent the die plate, cutter hub and cutter blades.
Figure 12:
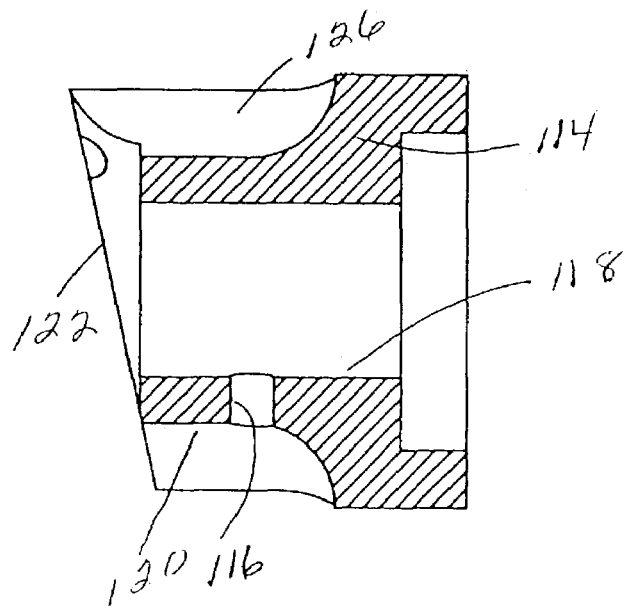
FIG. 12 is a vertical sectional view of the water flow guide illustrated in FIG. 11 taken along section line 12-12 on FIG. 11.

FIGS. 11 and 12 illustrate a fourth embodiment of the water flow guide generally designated by reference numeral 110 and which includes a tubular member 114 constructed in the same manner as the third embodiment illustrated in FIGS.

9 and 10, except that the tubular member 114 includes a radial hole 116 communicating the axial bore 118 in the water flow guide with the axial recess 120 in alignment with the pressurized water inlet. The radial hole 116 permits some flow of water into the axial bore 118 in the annular space between the bore and the drive shaft to flush the pellets, fines or the like from the area external of the shaft thereby protecting the shaft seals and prolonging their life. The slope of the free end 122 and the tapering slope down of the free end edge of the tubular member 114 is designated by reference numeral 124 and is the same as that illustrated in FIGS. 9 and 10. The axial recess 126 in the upper portion of the tubular member 114 is aligned with the water box outlet for the slurry of water and pellets in the same manner as the other embodiments of the water flow guide.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A method of directing a flow of water entering an inlet of a water box of an underwater pelletizer axially toward a die face and a cutter hub and cutter blades driven by a drive shaft, said underwater pelletizer having a tubular guide member separate from said water box and substantially filling the interior space within said water box, said guide member having a radial passageway in alignment with said inlet and forming an extension thereof, said passageway communicating with a cylindrical inner surface of said tubular guide member which surrounds and is generally concentric with an outer surface of said drive shaft to form an axial flow passageway between said drive shaft outer surface and said cylindrical inner surface of said guide member, said method comprising the steps of directing said water radially through said radial passageway and then axially through said axial flow passageway positioned within said guide member, said passageway including a discharge end at an end portion of said drive shaft having the cutter hub and cutter blades mounted thereon for discharging water toward said die face.

2. The method of claim 1, and further including the step of forcing discharge of water and pellets axially away from said die face, cutter hub and cutter blades and towards an outlet of said water box through an outlet channel defined by an axial recess in an external surface of said guide member and an inner surface of said water box and communicating with an outlet in said water box.

3. A method of directing water entering a water box through an inlet toward a die face, cutter hub and cutter blades driven by a drive shaft extending into said water box of an underwater pelletizer, said water box having a stationary substantially tubular water flow guide positioned therein in generally concentric relationship with said drive shaft, said water flow guide substantially filling said water box such that an external surface of said water flow guide is closely adjacent to or in contact with an internal surface of said water box, said water flow guide including at least one axially extending recess formed in said external surface, said method comprising:
    directing water through said inlet in a radial direction relative to said water flow guide; and
    redirecting said water into an axial direction toward said die face and rotating cutter hub and blades of said pelletizer through said axial recess of said stationary water flow guide, said axial flow of water moving substantially parallel to said external surface of said tubular flow guide as directed between said flow guide external surface and said water box internal surface.

4. The method of claim 3, and further including the step of forcing discharge of water and pellets axially away from said cutter blades and towards an outlet of said water box through a second axially extending recess in said stationary flow guide.

5. A method of controlling flow of water in an underwater pelletizer which includes a die plate with extrusion orifices terminating in a die face, a driven rotary cutter blade hub supported in opposed relation to said die face, cutter blades mounted on said blade hub and moving in a plane generally parallel to and closely adjacent said die face to cut strands of material extruded through said orifices into pellets, a drive shaft connected to said hub, a water box enclosing said die face, drive shaft, cutter blade hub and cutter blades, said water box including an inlet for water into said water box, an outlet for discharge of pellets entrained in the water, and a stationary water flow guide positioned therein that substantially fills the area between said drive shaft and an internal surface of said water box such that an external surface of said water flow guide is closely adjacent to or in contact with said internal surface of said water box, said water flow guide including a generally diametrically opposed pair of axially extending recesses formed therein, a first of said recesses facing said inlet and a second of said recesses facing said outlet, said method comprising the steps of:
    directing water flow through said inlet in a radial direction relative to said water flow guide;
    redirecting said water through contact with said water flow guide into an axial flow directed toward the die face and hub through said first flow guide recess facing said water box inlet, said axial flow being substantially parallel with said flow guide external surface and within said first flow guide recess; and
    directing discharge of water and pellets from said die face and hub axially toward the outlet through said second flow guide recess facing said water box outlet.

6. The method as defined in claim 5, wherein said step of directing discharge of water includes changing an axial flow of water and pellets through said second flow guide recess toward said water box outlet to a radial flow when exiting from said second flow guide recess and flowing through said water box outlet.

* * * * *